United States Patent [19]

Bosek

[11] Patent Number: 5,143,495
[45] Date of Patent: Sep. 1, 1992

[54] COUPLING SYSTEM FOR MACHINE TOOLS

[75] Inventor: Ronald P. Bosek, Davisburg, Mich.

[73] Assignee: GTE Valenite Corporation, Troy, Mich.

[21] Appl. No.: 605,064

[22] Filed: Oct. 29, 1990

[51] Int. Cl.[5] .............................................. B23C 5/26
[52] U.S. Cl. .................................. 409/233; 408/239 R
[58] Field of Search ..................... 409/231, 232, 233; 408/239 R, 239 A, 238; 82/159, 160, 161; 279/89, 77

[56] References Cited

U.S. PATENT DOCUMENTS

| | | | |
|---|---|---|---|
| 393,511 | 11/1888 | Leland | 408/110 |
| 3,490,333 | 1/1970 | Scruton | 409/233 |
| 3,791,257 | 2/1974 | Frazier et al. | 409/233 |
| 4,135,848 | 1/1979 | Hughes et al. | 408/239 A |
| 4,226,562 | 10/1980 | Schmid et al. | 409/233 |
| 4,680,999 | 7/1987 | Kojima et al. | 409/233 X |
| 4,684,301 | 8/1987 | Eckle | 409/232 |
| 4,758,122 | 7/1988 | Kubo | 409/233 |
| 4,844,671 | 7/1989 | Reinauer | 409/233 |
| 4,850,765 | 7/1989 | Ramunas | 409/234 |
| 4,932,295 | 6/1990 | Erickson | 409/233 |

FOREIGN PATENT DOCUMENTS

| | | | |
|---|---|---|---|
| 217460 | 1/1985 | Fed. Rep. of Germany | 409/233 |
| 218007 | 1/1985 | Fed. Rep. of Germany | 409/233 |
| 250489 | 10/1987 | German Democratic Rep. | 409/233 |
| 795756 | 1/1981 | U.S.S.R. | 409/233 |
| 948555 | 8/1982 | U.S.S.R. | 409/233 |
| 1117150 | 10/1984 | U.S.S.R. | 409/233 |

OTHER PUBLICATIONS

QCS Tool Holder System Brochure publ. Dec. 1985.

Primary Examiner—William Briggs
Attorney, Agent, or Firm—Bill C. Panagos

[57] ABSTRACT

A coupling system for selectively locking a tool to a toolholder, in which the locking mechanism carried by the toolholder has a cross-sectionally compact structure and provides release assist when the tool is being removed from the toolholder. The body of the toolholder has an axial drawbar bore in which a drawbar selectively slides. The forward end of the drawbar bore in combination with the forward end of the drawbar form a tool profile cavity which is contoured to seatably receive a tool profile of the tool. The drawbar is hollow and is provided with a pair of apertures. The locking mechanism within the drawbar comprises a pair of locking fingers which are pivotally mounted on a common pivot pin connected with the body. Each locking finger may rotate so as to be retracted within the drawbar or erupt out of the apertures in the drawbar. Rotation of the locking fingers is effected by interaction between the apertures and the locking fingers as the drawbar is axially moved in the drawbar bore. Finger slots are provided on the tool profile for engagingly receiving the locking fingers when the drawbar is moved toward the tool profile cavity. When the drawbar is moved away from the tool profile cavity, the locking fingers will retract and simultaneously axially push against the finger slots of the tool, thereby assisting disengagement of the tool from the toolholder.

23 Claims, 1 Drawing Sheet

COUPLING SYSTEM FOR MACHINE TOOLS

BACKGROUND OF THE INVENTION

1. Field of the Invention

The present invention is related to coupling systems for lockably connecting one machine tool to another, particularly to such a coupling system for releasably connecting a tool to a toolholder. Still more particularly, the present invention is related to a coupling system in which rotatable locking fingers selectively function to secure the tool to the toolholder as well as assist release of the tool from the toolholder.

2. Description of the Prior Art

It is well known in the machine tool art that toolholders of lathes, presses, or other industrial machines utilize interchangeable tools which are suited for various operations on workpieces. Generally, the tool is manually connected with the toolholder utilizing some form of releasable coupling system that locks the tool to the toolholder. Because of the nature of the forces encountered during industrial processes, the connection of the tool with the toolholder must be strong and stable, yet because of production cost concerns, the connection must be effected easily and quickly. Most commonly, the toolholder and the tool have portions contoured to form a mated male-female interrelationship (usually in the form of reciprocal cylindrical or frusto-conical shapes), the toolholder being provided with a locking mechanism having locking members which selectively radially move so as to interferingly engage the tool, thereby locking it with respect to the toolholder.

In the prior art there have been a number of attempts to provide a suitable coupling system for machine tools. These devices can be divided into two broad classes based upon the type of locking mechanism utilized: those having locking members in the form of balls, and those having locking members in the form of plungers.

The first class of coupling systems utilizes a toolholder having locking balls which selectively engage respective sockets on the tool so as to lock the tool with respect to the toolholder. Position of the locking balls for selective engagement with the tool is radially regulated by contact of the locking balls with a cam surface located on a bolt that is slidable within an axial bore of the toolholder. Examples of this first class of coupling systems are disclosed in U.S. Pat. Nos. 4,680,999 and 4,932,295.

The second class of coupling systems utilizes a toolholder having locking plungers which selectively engage a complementary shoulder of the tool to thereby lock the tool to the toolholder. U.S. Pat. Nos. 393,511, 4,684,301 and 4,850,765 are examples of coupling systems in which the locking plungers slide radially into or out of engagement with the tool in response to movement of a control member. U.S. Pat. Nos. 3,490,333, 3,791,257, 4,135,848, 4,226,562 and 4,844,671 are examples of coupling systems in which the locking plungers include arms which are pivotally connected to the toolholder; slidable movement of a bolt axially disposed within the toolholder cams against the arms, causing radial movement of the locking plungers into or out of engagement with the tool.

In each of the foregoing examples of the prior art, one or more locking members connected with the toolholder are caused to radially move into or out of engagement with the tool in response to movement of a control member. However, each of these structures require a number of laterally disposed internal components to effect retraction and engagement by the locking members, thereby limiting the minimum cross-section of the locking member, and, consequently, the toolholder. Such locking mechanisms in which the locking members are separately disposed across the cross-section of the toolholder require smaller sized components, resulting in compromised reliability and strength in situations involving smaller diameter tools. Further, none of the prior art devices address the issue of effecting removal of the tool from the toolholder after the locking members of the locking mechanism have retracted, a problem of great concern when the tool and toolholder have been precisely mated at very close tolerances.

Accordingly, what is needed is a coupling system for machine tools which is structured to provide a locking mechanism having substantial sized locking members even in applications involving small diameter tools, the coupling member further providing for positive assist to separate the tool from the toolholder during disengagement of the locking members with respect to the tool.

SUMMARY OF THE INVENTION

The present invention is a coupling system for selectively locking a tool to a toolholder, in which the locking mechanism carried by the toolholder has a cross-sectionally compact structure and provides release assist when the tool is being removed from the toolholder.

The toolholder includes a cylindrically shaped body having an axial drawbar bore, the body terminating at one end in a tool profile cavity and at the other end in a shoulder. A drawbar of cylindrical shape axially slides within the drawbar bore. The rearward end of the drawbar is connected with a biasing means which biases against the shoulder for biasing the drawbar in a direction away from the tool profile cavity. The forward end of the drawbar projects into the tool profile cavity. The drawbar is provided with an axial carrier bore which blindly terminates adjacent the forward end of the drawbar. A carrier of cylindrical shape is located within the axial carrier bore of the drawbar, and is fixedly secured to the body of the toolholder. Thus, the drawbar may be slidably moved axially along the drawbar bore, and the carrier thereupon slides along the carrier bore while remaining in a fixed position relative to the body. A pair of locking fingers are tandemly connected to the carrier via a pivot pin that is connected to the carrier. Each locking finger may selectively erupt into the tool profile cavity through a respective locking finger aperture in the drawbar. Eruption of the locking fingers is effected by interaction between the locking finger apertures and the locking fingers as the drawbar is axially moved away from the tool profile cavity. A guide slot regulates maximum axial movement of the drawbar within the drawbar cavity.

The tool includes a tool profile structured to mate with the tool profile cavity of the toolholder. The tool profile further includes a drawbar cavity for receiving therein the forward end of the drawbar. Finger slots are provided on the tool profile for engagingly receiving the locking fingers.

The tool is attached to the toolholder by firstly moving the drawbar axially toward the tool profile cavity, resulting in full retraction of the locking fingers within the drawbar. Thereupon, the tool profile is seated within the tool profile cavity of the toolholder. Finally, the drawbar is moved away from the tool profile cavity, resulting in the locking fingers being caused to erupt into the finger slots on the tool profile. Removal of the tool is accomplished by reversing the aforesaid steps. In this regard, as the drawbar is moved toward the tool profile cavity, the locking fingers will axially push against the finger slots of the tool, thereby assisting in disengagement of the tool profile from the tool profile cavity.

Accordingly, it is an object of the present invention to provide a coupling system for releasably locking a tool to a toolholder in which a pair of locking fingers are pivotally connected with the toolholder for being selectively rotated into locking engagement with the tool, the rotation of the locking fingers providing a cross-sectional superposition of the locking fingers when retracted, thereby minimizing the required cross-section of the toolholder.

It is a further object of the present invention to provide a coupling system for releasably locking a tool to a toolholder, the toolholder having a locking mechanism in which locking fingers are tandemly mounted to a common pivot, thereby minimizing the required toolholder cross-section to accommodate the locking mechanism.

It is an additional object of the present invention to provide a coupling system for releasably locking a tool to a toolholder in which a pair of locking fingers pivotally connected with the toolholder are selectively rotated for lockably engaging the tool, rotation of the locking fingers out of locking engagement with the tool resulting in the tool being forcibly unseated with respect to the toolholder.

These, and additional objects, advantages, features and benefits of the present invention will become apparent from the following specification.

DETAILED DESCRIPTION OF THE PREFERRED EMBODIMENT

Figure 1:
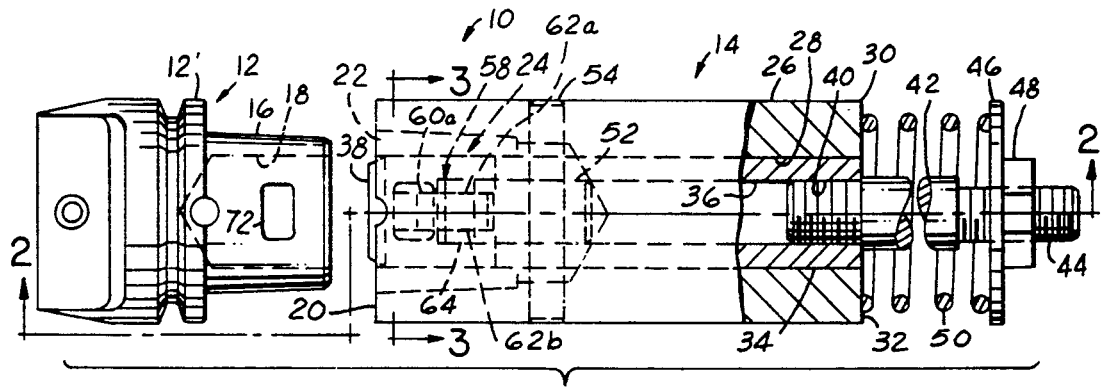
FIG. 1 is a part sectional top plan view of the coupling system according to the present invention.
Figure 2:
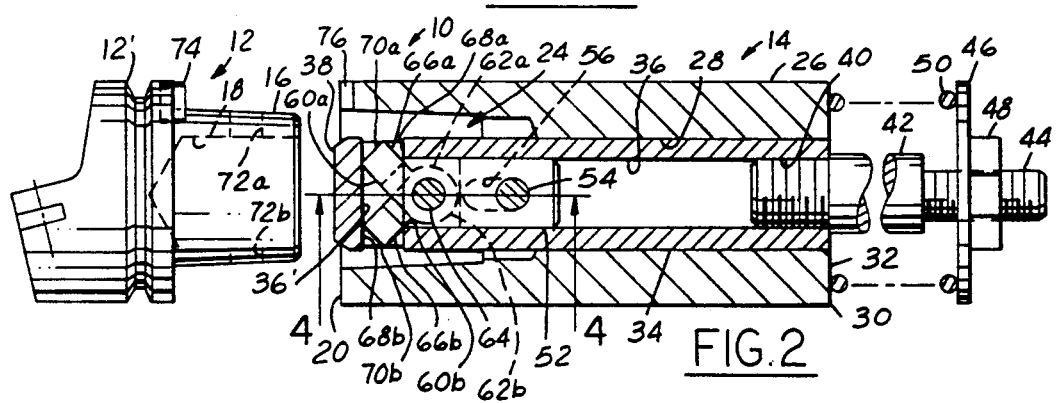
FIG. 2 is a part sectional side view of the coupling system, seen along lines 2—2 in FIG. 1.
Figure 5:
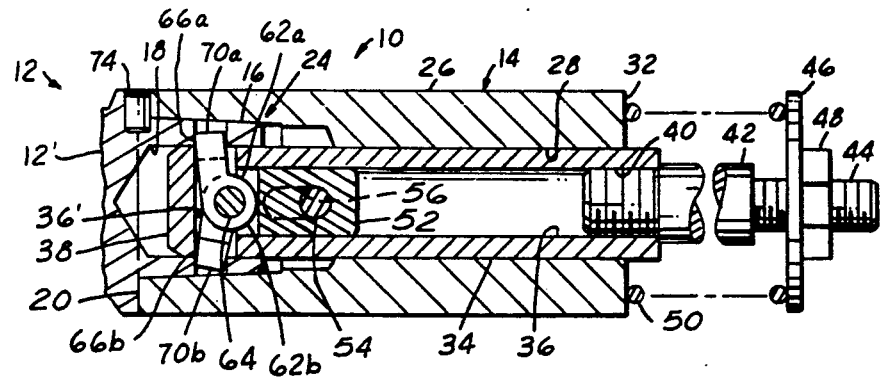
FIG. 5 is a part sectional side view of the coupling system, shown in operation.

Referring now to the Drawing, FIGS. 1, 2 and 5 generally show the coupling system 10 according to the present invention. The coupling system 10 is composed of two complementary components: a tool 12 and a toolholder 14. The tool 12 is composed of a tool member 12' and, projecting from one end thereof, a tool profile 16 that is further defined by a drawbar cavity 18. The toolholder 14 includes at one end a tool profile cavity 22. As can be best understood by reference to FIG. 5, the tool profile 16 is shaped complementarily to the tool profile cavity 22 so that the tool profile may be securely seated in the tool profile cavity of the toolholder. The toolholder 14 is provided with a locking mechanism 24 for selectively locking the tool in a seated relationship with respect to the tool profile cavity.

Figure 3:
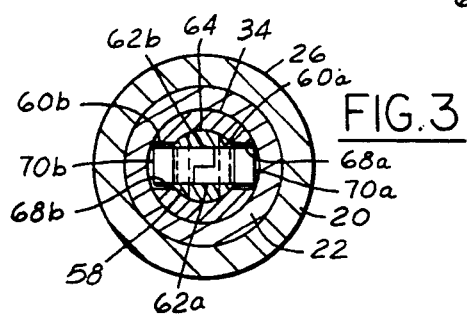
FIG. 3 is a cross-sectional view of the coupling system, seen along lines 3—3 in FIG. 1.
Figure 4:
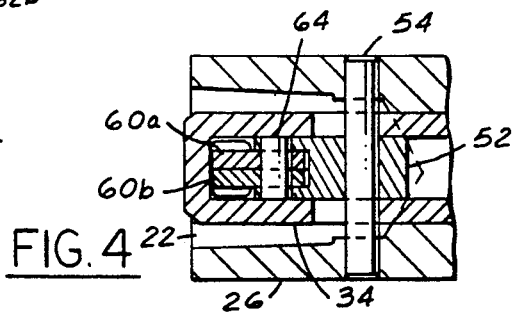
FIG. 4 is a sectional detail side view of the coupling system, seen along lines 4—4 in FIG. 2.

The toolholder 14 is composed of a body 26 of elongate cylindrical shape. While an elongate cylindrical shape is preferred, those skilled in the art shall recognize that the body 26 may be shaped other than as an elongate cylinder and yet function as described generally herein. The body 26 has an axially disposed drawbar bore 28. The rearward end 30 of the body 26 forms a shoulder 32, the purpose of which will become clear from the following description. The drawbar bore 28 adjacent to, and rearward from, the forward end 20 of the body 26 is contoured to form the tool profile cavity 22 which is shaped reciprocally to the contour of the tool profile 16. A drawbar 34 of cylindrical shape is guidably received within the drawbar bore 28 for slidable movement therewithin. The drawbar 34 has an axially disposed carrier bore 36 which terminates blindly in an abutment 36' at the forward end 38 thereof. The rearward end portion 40 of the drawbar is threaded to threadably receive a drawstud 42, the drawstud extending rearwardly from the shoulder 32. The drawstud 42 terminates remotely from the shoulder in a threaded end portion 44 which supports a thrust washer 46 and threadably engages a retainer nut 48. Trapped between the shoulder 32 and the thrust washer 46 is a spring 50 which is in part compressed so as to biasably urge the drawbar in a direction away from the forward end 20 of the body 26. Spaced from the forward end of the drawbar 34 is a carrier 52 of cylindrical shape that is guidably disposed within the drawbar bore 28 for slidable movement therewithin. The carrier 52 is fixed with respect to the body 26 via a stop pin 54 which passes through the carrier 52 and is secured at either end to the body 26. Relative movement of the carrier 52 with respect to the body 26 is limited by interference between the stop pin 54 and opposing surfaces of a guide slot 56 of elongate shape in the drawbar 34. The forward end of the carrier 52 forms a clevis 58 to which a pair of locking fingers 60a and 60b are pivotally connected side-by-side at respective knuckles 62a and 62b via a pivot pin 64. As can be most readily ascertained by reference to FIGS. 3 and 4, the knuckles 62a and 62b are dimensioned to be one-half the thickness of the fingers 66a and 66b of the locking fingers 60a and 60b. This structural configuration permits the locking fingers to be adjacently nested in partial superposition, thereby minimizing the required cross-section of the carrier bore 36 needed to accommodate the clevis 58. Adjacent the abutment 36' of the drawbar 34 are provided finger apertures 68a and 68b through which selectively extend finger tips 70a and 70b of the fingers 66a and 66b. As can be best understood by referece to FIGS. 2 and 5, the length of the fingers 66a and 66b is related to the separation between the forward end 56 of the carrier 52 and the abutment 36', in that in a retracted position, as depicted in FIG. 2, the finger tips 70a and 70b are located fully within the drawbar 34, and that in an erupted position, as depicted in FIG. 5, the finger tips extend outwardly from the drawbar so as to lockably engage respective finger slots 72a and 72b in the tool profile 16, as shown in FIG. 5. Alignment of the tool profile 16 with respect to the tool profile cavity 22 so that the finger tips 70a and 70b may engage the finger slots 72a and 72b is provided by a detent 74 located on the tool profile being received into a recess 76 located on the forward end 20 of the body 26.

Operation of the coupling system 10 will now be described.

Connection of the tool 12 to the toolholder 14 is effected by firstly applying an axial force via any conventional medium (not shown) to the drawstud 42, thereby overcoming the biasing force of the spring 50 and causing the drawbar 34 to slide toward the forward end 20 of the body 26. Since the carrier 52 cannot move, the drawbar slides relative to the carrier. The locking fingers 60a and 60b which are pivotally connected to the carrier are forced to rotatably retract into the drawbar by abutting contact with the finger apertures 68a and 68b. Movement of the drawbar is limited by the stop pin 54 abutting one end of the guide slot 56. The tool 12 is now seated with respect to the toolholder 14 by placing the tool profile 16 within the tool profile cavity 22, a portion of the drawbar being received by the drawbar cavity 18. The spring is now allowed to bias the drawstud away from the body. Since again the carrier and its associated locking fingers are immobile relative to the body, the finger apertures 68a and 68b in the drawbar abuttingly cause the locking fingers to rotate so that the finger tips 70a and 70b erupt outwardly from the drawbar and into the finger slots 72a and 72b of the tool profile. In order that the fingers 66a and 66b are able to rotate as described, the finger apertures 68a and 68b have a width that is larger than that of the fingers in order to accommodate the finger tips when in the retracted position, as shown in FIG. 2. The other end of the guide slot will abut the stop pin, thereby defining the final orientation and position of the finger tips. At this final position, the spring will biasably act on the drawbar with a predetermined force. This force may be varied by adjusting the distance between the shoulder 32 and the thrust washer 46 by rotation of the retainer nut 48, or by replacing the spring or replacing the drawstud.

Removal of the tool from the toolholder is effected by again utilizing the external medium to axially act on the drawstud to slide the drawbar toward the forward end of the body. In so doing, the finger tips will abut the finger slots in the tool profile, causing the tool to move axially away from the body. Thusly, as the locking fingers retract, they also apply an ejective force onto the tool, thereby assisting removal of the tool from the toolholder. Once the finger tips are entirely retracted within the drawbar, the tool profile may be easily removed from the tool profile cavity.

To those skilled in the art to which this invention appertains, the above described preferred embodiment may be subject to change or modification. For instance, while a spring has been described to bias the drawbar, any other biasing device could be utilized, including hydraulic or pneumatic devices. Further, it will be understood that the male-female seating between the tool profile and the tool profile cavity can be effected utilizing mutually reciprocal cylindrical, frusto-conical or other shapes. Such change or modification can be carried out without departing from the scope of the invention, which is intended to be limited only by the scope of the appended claims.

What is claimed is:

1. A coupling system for lockably coupling together machine tool components, said coupling system comprising:
   a toolholder, comprising:
      a body having a forward end and a rearward end, said body having an axially disposed drawbar bore extending between said forward and rearward ends thereof, said drawbar bore forming a tool profile cavity substantially adjacent said forward end of said body;
      a drawbar guidably positioned within said drawbar bore of said body for slidable movement within said drawbar bore, said drawbar having a forward end and a rearward end, said forward end of said drawbar projecting axially into said tool profile cavity, said drawbar having an axially disposed carrier bore extending from said rearward end thereof to a blind terminus at said forward end thereof, said drawbar having a pair of apertures adjacent said forward end thereof;
      a carrier located within said carrier bore of said drawbar, said carrier being fixedly connected with respect to said body at a predetermined location within said carrier bore;
      a pair of locking fingers rotatably connected with said carrier, each locking finger of said pair of locking fingers having a finger tip, each finger tip being respectively aligned with each aperture of said pair of apertures in said drawbar, each said finger tip cooperating with its respective aperture to abuttably cause rotation of said locking fingers in response to slidable movement of said drawbar with respect to said body; and
   a tool, comprising:
      a tool portion; and
      a tool profile projecting from said tool portion, said tool profile being shaped reciprocal with respect to said tool profile cavity of said body for being seatably received by said tool profile cavity, said tool profile further defining a drawbar cavity dimensioned for receiving said drawbar therewithin, said tool profile having a pair of finger slots, each finger slot being alignable with a respective said aperture in said drawbar;
wherein axial movement of said drawbar toward said forward end of said body causes said apertures to abuttably interact with said locking fingers to thereby cause said locking fingers to rotate until said finger tips are retracted into said drawbar, and further wherein axial movement of said drawbar away from said forward end of said body causes said apertures to abuttably interact with said locking fingers to thereby cause said locking fingers to rotate until said finger tips erupt outwardly from said draw bar and be engagably received by said finger slots in said tool profile.

2. The coupling system of claim 1, further comprising biasing means for biasing said drawbar away from said forward end of said body.

3. The coupling system of claim 2, wherein said biasing means comprises:
   a drawstud having a first end and a second end, said first end of said drawstud being connected with said rearward end of said drawbar;
   a thrust washer mounted on said drawstud;
   retainer means connected with said drawstud adjacent said second end thereof for retaining said thrust washer mountably on said drawstud; and
   biasing means resiliently biasing against each of said rearward end of said body and said thrust washer for biasing said drawbar away from said forward end of said body.

4. The coupling system of claim 2, further comprising regulation means for regulating slidable movement of said drawbar relative to said body.

5. The coupling system of claim 4, wherein said regulation means comprises:
   a stop pin connected with said body; and at least one guide slot in said drawbar, said at least one guide slot receiving said stop pin, said slidable movement of said drawbar being regulated by said stop pin abutting opposite portions of said at least one guide slot.

6. The coupling system of claim 4, wherein said stop pin connects said carrier fixedly to said body.

7. The coupling system of claim 1, wherein said locking fingers comprise:
   a first locking finger having a first knuckle, a first finger integrally connected said first knuckle and a first finger tip integrally connected with said first finger; and
   a second locking finger having a second knuckle, a second finger integrally connected said second knuckle and a second finger tip integrally connected with said second finger;
   said coupling mechanism further comprising a pivot pin connected with said carrier, each of said first and second knuckles being pivotally connected with said pivot pin, said first and second finger tips rotating mutually toward each other in response to movement of said drawbar toward said tool profile cavity, said first and second finger tips rotating mutually away from each other in response to movement of said draw bar away from said tool profile cavity.

8. The coupling system of claim 7, wherein each said finger tip has a first cross-section parallel with said pivot pin, wherein further each said knuckle has a second cross-section parallel with said pivot pin, said first cross-section being substantially one-half said second cross-section.

9. The coupling system of claim 7, further comprising biasing means for biasing said drawbar away from said forward end of said body.

10. The coupling system of claim 9, wherein said biasing means comprises:
    a drawstud having a first end and a second end, said first end of said drawstud being connected with said rearward end of said drawbar;
    a thrust washer mounted on said drawstud;
    retainer means connected with said drawstud adjacent said second end thereof for retaining said thrust washer mountably on said drawstud; and
    biasing means resiliently biasing against each of said rearward end of said body and said thrust washer for biasing said drawbar away from said forward end of said body.

11. The coupling system of claim 9, further comprising regulation means for regulating slidable movement of said drawbar relative to said body.

12. The coupling system of claim 11, wherein said regulation means comprises:
    a stop pin connected with said body; and
    at least one guide slot in said drawbar, said at least one guide slot receiving said stop pin, said slidable movement of said drawbar being regulated by said stop pin abutting opposite portions of said at least one guide slot.

13. The coupling system of claim 11, wherein said stop pin connects said carrier fixedly to said body.

14. The coupling system of claim 1, wherein said first and second finger tips are structured to forcibly act upon said tool profile so as to unseat said tool profile from said tool profile cavity as said first and second finger tips rotate mutually toward each other in response to slidable movement of said drawbar away from said tool profile cavity.

15. The coupling system of claim 14, further comprising biasing means for biasing said drawbar away from said forward end of said body.

16. The coupling system of claim 15, wherein said biasing means comprises:
    a drawstud having a first end and a second end, said first end of said drawstud being connected with said rearward end of said drawbar;
    a thrust washer mounted on said drawstud;
    retainer means connected with said drawstud adjacent said second end thereof for retaining said thrust washer mountably on said drawstud; and
    biasing means resiliently biasing against each of said rearward end of said body and said thrust washer for biasing said drawbar away from said forward end of said body.

17. The coupling system of claim 15, further comprising regulation means for regulating slidable movement of said drawbar relative to said body.

18. The coupling system of claim 17, wherein said regulation means comprises:
    a stop pin connected with said body; and
    at least one guide slot in said drawbar, said at least one guide slot receiving said stop pin, said slidable movement of said drawbar being regulated by said stop pin abutting opposite portions of said at least one guide slot.

19. The coupling system of claim 17, wherein said stop pin connects said carrier fixedly to said body.

20. A locking mechanism for selectively locking a tool seated with respect to a toolholder, the tool having a tool profile for being seated within a complementarily shaped tool profile cavity of the toolholder, said locking mechanism comprising:
    a pivot pin fixedly connected with the toolholder at a predetermined position relative to the tool profile cavity;
    a pair of locking fingers rotatably connected with said pivot pin, each locking finger of said pair of locking fingers having a finger tip;
    slot means in the tool profile for selectively receiving said each finger tip of said pair of locking fingers to thereby lockably engage the tool to the toolholder; and
    control means engaging said pair of locking fingers for effecting rotative movement of said pair of locking fingers, said first and second finger tips rotating mutually toward each other until said finger tips do not engage said slot means in response to a first direction of movement of said control means, said first and second finger tips rotating mutually away from each other until said finger tips lockably engage said slot means in response to a second direction of movement of said control means.

21. The locking mechanism of claim 20, further comprising biasing means for biasing said control means in a direction away from the tool profile cavity of the toolholder.

22. The locking mechanism of claim 20, wherein said first and second finger tips are structured to forcibly act upon said tool profile so as to unseat said tool profile from said tool profile cavity as said first and second finger tips rotate mutually toward each other in response to said control means moving in said first direction of movement.

23. The locking mechanism of claim 22, further comprising biasing means for biasing said control means in a direction away from the tool profile cavity of the toolholder.

* * * * *